United States Patent [19]

Saito et al.

[11] Patent Number: 4,729,031
[45] Date of Patent: Mar. 1, 1988

[54] COUPLING SYSTEM FOR IMAGE PROJECTION

[75] Inventors: Shobu Saito; Isao Yoshizaki, both of Yokohama; Yoshiaki Iwahara, Yokosuka; Masanori Oguino; Osamu Shuugizono, both of Yokohama, all of Japan

[73] Assignee: Hitachi, Ltd., Tokyo, Japan

[21] Appl. No.: 634,559

[22] Filed: Jul. 26, 1984

[30] Foreign Application Priority Data

Jul. 28, 1983 [JP] Japan ................................ 58-135855

[51] Int. Cl.$^4$ .............................................. H04N 5/74
[52] U.S. Cl. ...................................... 358/237; 358/60; 358/247; 358/252
[58] Field of Search ............... 358/237, 60, 250, 251, 358/252, 253, 247

[56] References Cited

U.S. PATENT DOCUMENTS

| | | | |
|---|---|---|---|
| 3,879,627 | 4/1975 | Robinder | 358/252 X |
| 3,909,524 | 9/1975 | Ohkoshi et al. | 358/252 X |
| 4,027,328 | 5/1977 | Lessman | 358/60 X |
| 4,151,554 | 4/1979 | Tucker | 358/60 |
| 4,163,990 | 8/1979 | Hodges | 358/60 X |
| 4,185,220 | 1/1980 | Oberg | 358/252 X |
| 4,249,205 | 2/1981 | Buchroeder | 358/237 X |
| 4,329,620 | 5/1982 | Lanciano | 358/247 X |
| 4,417,273 | 11/1983 | Kloss | 358/237 X |
| 4,453,178 | 6/1984 | Miyatake et al. | 358/237 X |
| 4,511,927 | 4/1985 | Bauer | 358/250 |
| 4,612,582 | 9/1986 | Tucker | 358/237 |
| 4,621,294 | 11/1986 | Lee | 358/237 |

OTHER PUBLICATIONS

Kirk-Othmer, Encyclopedia of Chemical Technology, vol. 20, Oct. 31, 1983, pp. 940-957.

Primary Examiner—James J. Groody
Assistant Examiner—E. Anne Faris
Attorney, Agent, or Firm—Antonelli, Terry & Wands

[57] ABSTRACT

In a video projector for projecting a video picture displayed on a Braun tube, the space between the Braun tube and a lens is filled with a medium having a refractive index substantially equal to those of both the glass faceplate of the braun tube and the material of the lens, and the medium is a silicon resin of the mixture of two liquids which is in liquid phase just after the mixing of two or three or above liquids but cured after lapse of a certain time into a gel state, and the lens is supported by a lens holder so that it can be moved freely along the optical axis within the lens holder.

3 Claims, 12 Drawing Figures

COUPLING SYSTEM FOR IMAGE PROJECTION

This invention relates to a video projector for projecting a video picture displayed on Braun tubes through lenses, and particularly to an improvement in the brightness and contrast ratio of projected video picture.

The present invention will be apparent from the following detailed description taken in conjunction with the accompanying drawings, in which.

Figure 1:
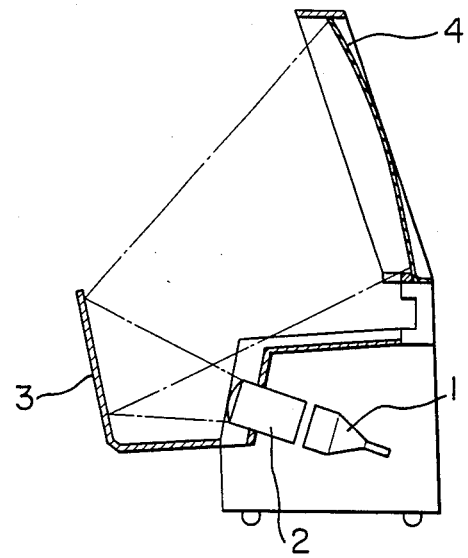
FIG. 1 is a side view of a conventional video projector of the front projection type projector.
Figure 2:
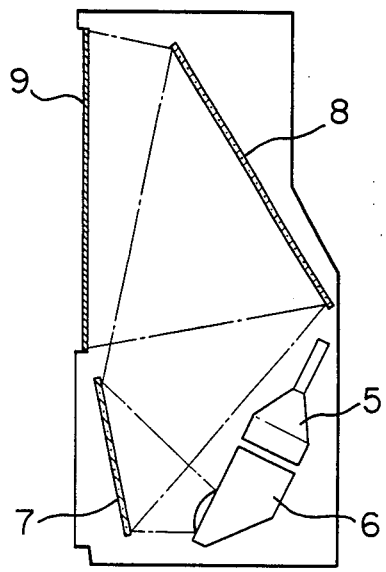
FIG. 2 is a side view of a conventional video projector of the rear projection type projector.

The video projector can be classed in two kinds: the front projection type projector and the Rear projection type projector. FIGS. 1 and 2 are side views of the front projection type projector and Rear projection type projector, respectively.

As shown in FIG. 1, a video picture displayed on a Braun tube 1 is magnified by a lens 2, reflected from a mirror 3, and then projected onto a screen 4. On the other hand, in FIG. 2, a picture displayed on a Braun tube 5 is magnified by a lens 6, reflected from first and second mirrors 7 and 8 in turn, and then projected onto a screen 9. Although only a single Braun tube is shown in each of FIGS. 1 and 2, three Braun tubes for the display of red, green and blue video pictures and three lenses associated therewith are actually used and the red, green and blue video pictures are mixed on the screen.

Figure 3:
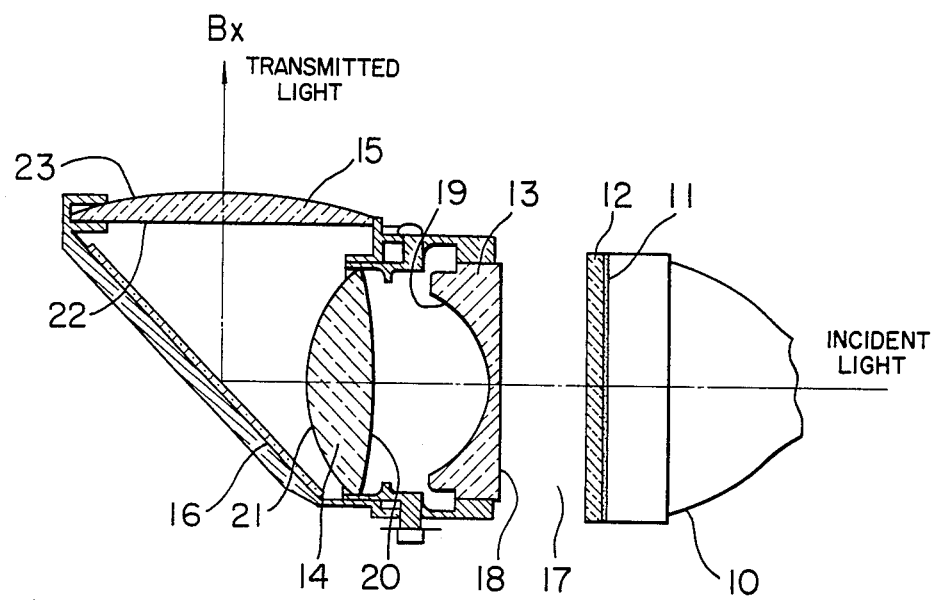
FIG. 3 is a side view of a Braun tube and lenses showing the positional relation therebetween.

In the conventional video projector, the space between the glass faceplate of the Braun tube and the lens is filled with air. Therefore, the intensity of light transmitted through the faceplate is decreased because of the reflection of light at the interface between the glass faceplate of the Braun tube and air and that between the lens and air. FIG. 3 is a longitudinal cross-sectional view of the arrangement of the Braun tube and lenses.

Referring to FIG. 3, reference numeral 10 represents a Braun tube, 11 a phosphor screen, and 12 a glass faceplate of the Braun tube. A lens system is formed of three lenses 13, 14 and 15 and a mirror 16. Reference numeral 17 represents an air layer between the Braun tube and lens. The light emitted from the phosphor screen is passed through the glass 12, the air layer 17 and the lenses 13 and 14 and reflected from the mirror 16 into the lens 15.

If the intensity of the light just emitted from the phosphor screen 11 is represented by Bo, and the intensity of the light passed through the lens 15 by Bx, then the intensity of light, Bx can be calculated as follows.

Figure 4:
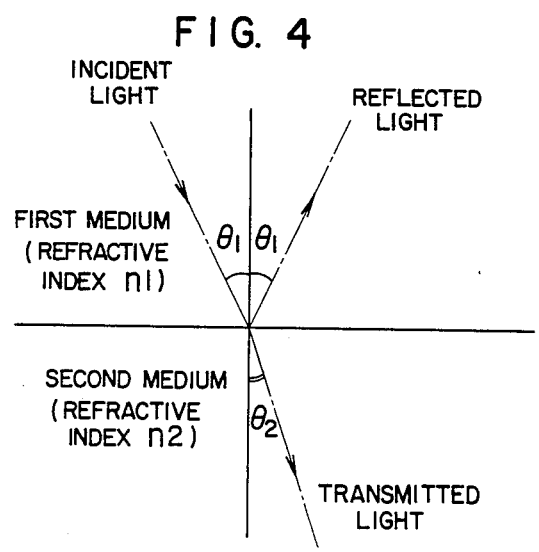
FIG. 4 is a diagram for explaining the propagation characteristic of light in media.

FIG. 4 shows the characteristic of light propagating in two media with different refractive indexes. When light transmitting in a first medium is incident to a second medium at angle $\theta_1$ (where $\theta_1$ is assumed to be small), part of the light is reflected therefrom and the other part thereof is refracted thereinto, provided that the absorption and dispersion of light in the media are negligibly small. Moreover, the reflectivity, r and transmission coefficient, T are generally defined as follows:

$$r = \frac{\text{intensity of reflected light}}{\text{intensity of incident light}} \tag{1}$$

$$T = \frac{\text{intensity of emitted light}}{\text{intensity of incident light}} \tag{2}$$

If the refractive index of the first medium is taken as n1, and that of the second medium as n2, the r and T are given by the following equations:

$$r = \left(\frac{n1 - n2}{n1 + n2}\right)^2 \tag{3}$$

$$T = 1 - r \tag{4}$$

The first medium is assumed to be glass and the second medium to be air. The refractive index of glass is dependent on the kind, and typically about 1.54. The refractive index of air is 1.00. Thus, n1=1.54 and n2=1.00. The r and T are calculated from Eqs. (3) and (4) as r=0.045 (4.5%), T=0.955 (95.5%).

The lenses in FIG. 3 are made of glass or plastic material, and to increase the transmission coefficient, the surfaces, 18 to 23 of the lenses 13, 14 and 15 are often covered with a reflection preventing film, or generally a nonreflection coating. In this case, a typical reflectivity of the interface between the lens surface and air is about 1.5% and hence the transmission coefficient is about 98.5%. Such interface exists between the glass 12 and the air 17, between the air 17 and the nonreflection coating surface 18, and similarly at the nonreflection coating surfaces 19, 20, 21, 22 and 23, or at a total of 7 places. A typical reflectivity at the interface between the surface of the mirror 16 and air is about 96%. Thus, the intensity, Bx of transmitted light relative to the intensity, Bo of emitted light from the phosphor screen is calculated as $$Bx = (0.985)^7 \times 0.96 = 0.864 \ (86.4\%) \tag{5}$$

In other words, the intensity of transmitted light is 86.4%, or 13.6% smaller than the intensity of emitted light.

Figure 5A:
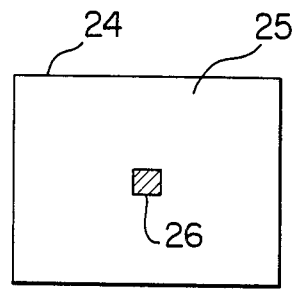
FIGS. 5a and 5b are front and side views of a Braun tube, useful for explaining the reflection of light in the glass faceplate of a Braun tube.
Figure 5B:
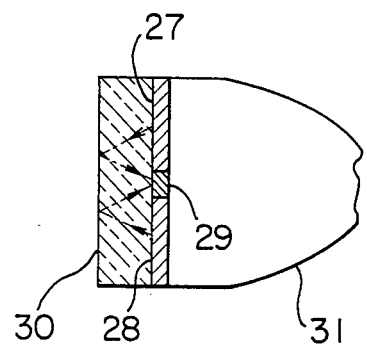

Now, let it be considered that as shown in FIG. 5a, the whole or a displayed picture 24 is white 25 except the black portion, 26 at its center. Then, the displayed black portion becomes bright because of the reflection of light in the glass faceplate as shown in FIG. 5b, and therefore the contrast ratio thereof is deteriorated. That is, the light emitted from phosphor screen portions 27 and 28 excited to be white is reflected from a glass faceplate 30 into a black portion 29, thus brightening it to deteriorate the contrast ratio. The contrast ratio is given by the following expression:

$$\text{Contrast ratio} = B_W/B_B \quad (6)$$

where $B_W$ is the brightness of the black portion and $B_B$ is that of the white portion. The following table 1 lists measured values of brightness and transmission coefficient concerning the white and black portions.

TABLE 1

|  | White portion cd/m$^2$ | Black portion cd/m$^2$ | Contrast ratio |
|---|---|---|---|
| Brightness on Braun tube face | 4,000 | 178 | 22.5 |
| Brightness after passing through lens | 3,645 | 360 | 10.1 |
| Transmission coefficient | 91.1% | — | — |

An object of this invention is to provide a video projector capable of bright and better contrast ratio projection of a video picture.

According to this invention, there is provided a video projector with the spaces between the Braun tubes and lenses being filled with a medium of which the refractive index is substantially equal to those of the glass faceplate of the Braun tubes and the lenses, thereby greatly improving the brightness and contrast ratio.

Figure 6:
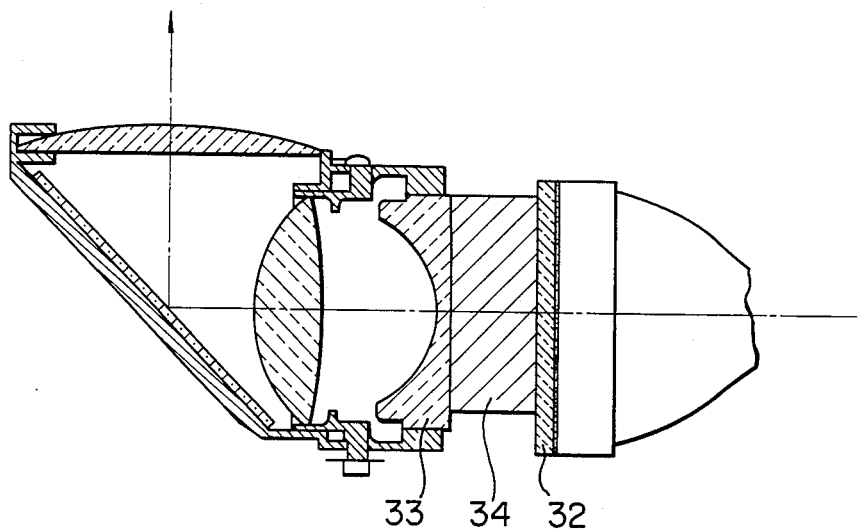
FIG. 6 is a cross-sectional diagram of a coupling portion between a lens and a Braun tube.

One embodiment of this invention will hereinafter be described with reference to FIG. 6. There is a method in which, as shown in FIG. 6, the space between a glass faceplate 32 of the Braun tube and a lens 33 is filled with a medium 34 with a refractive index substantially equal to those of the glass and lens. It is now assumed that the refractive index of the glass faceplate is represented by ng, that of the medium of the lens by nl, and that of the medium 34 by nx. Then, the reflectivity, rgx at the interface between the glass faceplate 32 and the medium 34, and that, rlx at the interface between the lens 33 and the medium 34 are expressed by the following equations:

$$rgx = \left(\frac{ng - nx}{ng + nx}\right)^2 \quad (7)$$

$$rlx = \left(\frac{nl - nx}{nl + nx}\right)^2 \quad (8)$$

If nx=ng=nl, the rgx and rlx are both zero. Thus, similarly as in Eq. (5) the intensity of transmitted light, $Bx_1$ can be calculated as $$Bx_1 = (0.985)^5 \times 0.96 = 0.890 \, (89\%) \quad (9)$$

The brightness, from the result of Eq. (9) can be improved by about 3% as compared with Eq. (5).

The contrast ratio in FIG. 5 was deteriorated by the reflection in the glass faceplate of the Braun tube as described previously.

According to this invention as shown in FIG. 6, if nx=ng=nl, an extremely large contrast ratio can be achieved because there is no reflection as mentioned above. However, since it is actually difficult that nx=ng=nl, there is some residual reflection in the glass faceplate and the reflected light from the periphery portion for supporting the lens, so that the contrast ratio deteriorates. Nevertheless, the contrast ratio can be greatly improved as compared with the case of air between the Braun tube and the lens.

The case where the medium shown in FIG. 6 is silicon resin will be described below. Although there are various different kinds of silicon resin, the silicon resin suitable for use in this invention has a large transmission coefficient and a refractive index substantially equal to that of glass or acrylic resin and is colorless, or transparent. In addition, such silicon resin is necessary to be liquid in order to be used in this invention. In other words, the reflection of light at the interface between the glass faceplate of Braun tube and air and between the lens surface and air can be reduced by the liquid silicon resin filled in the space between the glass faceplate of Braun tube and lens. This will be described with reference to FIGS. 7 and 8.

Figure 7:
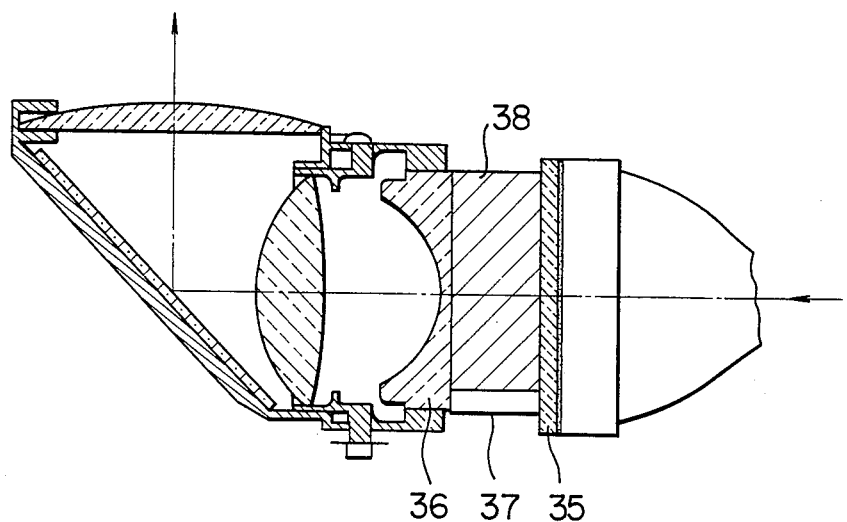
FIGS. 7 and 8 are a cross-sectional view and side view of an embodiment of this invention.
Figure 8:
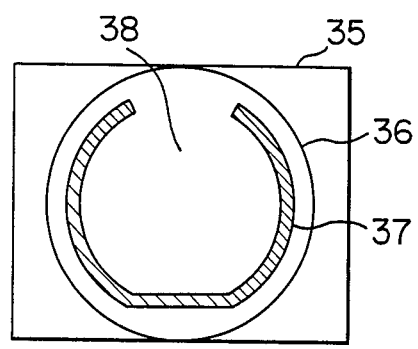

Referring to FIGS. 7 and 8, reference numeral 35 represents a glass faceplate of Braun tube, 36 a lens and 37 a sealing material for preventing the liquid silicon resin from leaking.

A two-liquid mixture type silicon resin will be mentioned which is in liquid phase just after the mixture of two liquids but becomes cured a certain time after the mixture to be in a gel state. Such silicon resin can be easily poured in the space because it is liquid just after the mixture of two liquids. Also, since this resin is cured in a certain time, it does not leak even if the entrance through which the resin was poured in the space is not closed and foreign matters such as dust will not be mixed into the space even after the lapse of long time.

Figure 9:
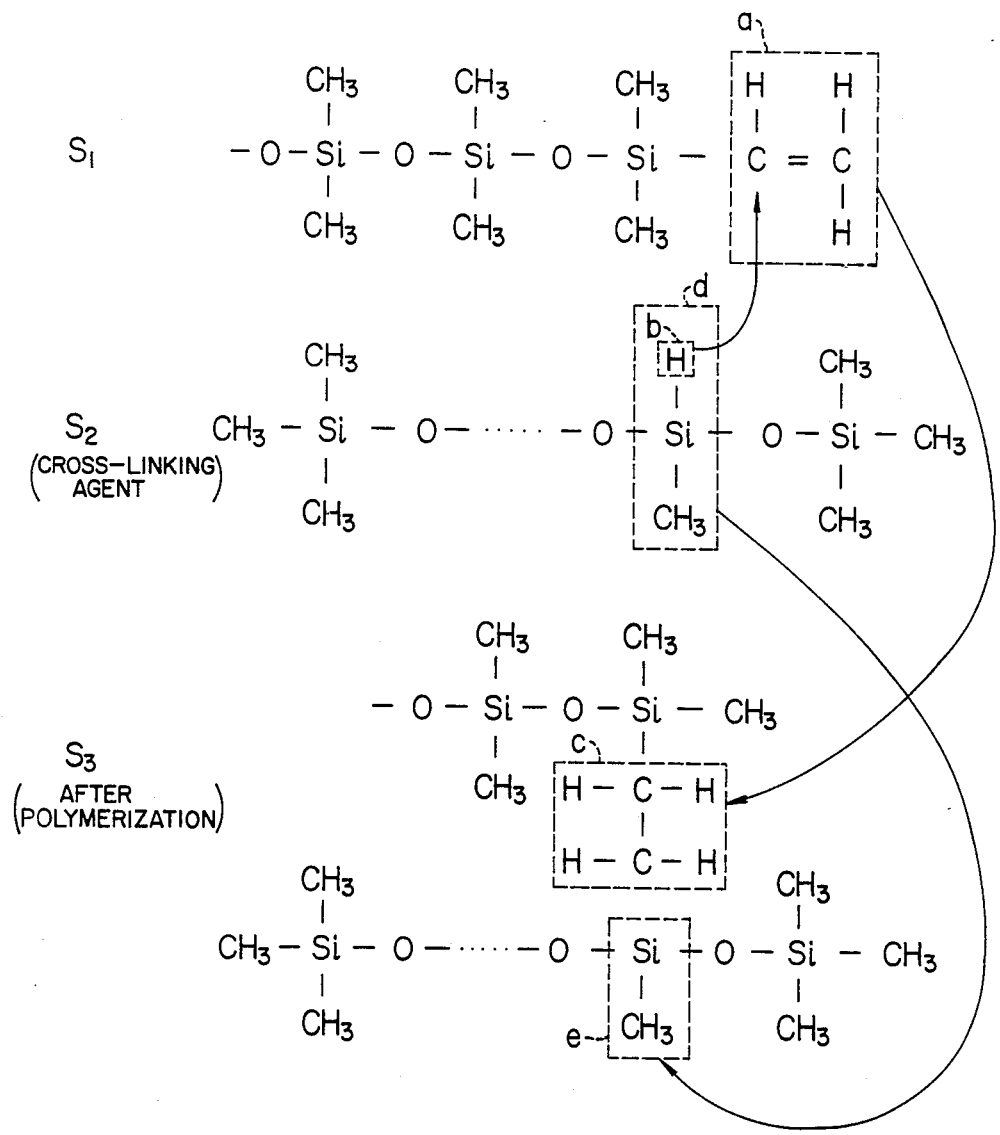
FIG. 9 shows constitutional formulas of two-liquid mixture type silicon resin before and after reaction.

This two-liquid mixture type silicon resin will be described. FIG. 9 shows the reaction between two liquids A and B. The liquids A and B have the same main constituents (shown by $S_1$), but the liquid A is added with a small amount of a catalyst for promoting the curing reaction. The liquid B is added with a small amount of a cross-linking agent (shown by $S_2$). The liquids A and B are each in liquid phase when they are separated, but react with each other when mixed, in which case the reaction changes as shown by $S_3$.

In other words, the double bond in —CH=CH$_2$ shown at a comes off and couples with the H shown at b, resulting the portion shown at c. Also, the portion at d changes to the portion at e. In this way, the $S_1$ and $S_2$ are polymerized into $S_3$. The reaction gradually proceeds and after the lapse of 24 hours at the normal temperature, it ends in gel state. The hardness of the gel-state silicon resin after reaction can be adjusted by changing the ratio of the liquids A and B mixed.

When the two-liquid mixture type silicon resin is used, and when the gel-state silicon resin is filled in the portion 38 shown in FIG. 7, it is necessary that the gel-state silicon resin be in intimate contact with the surface of the faceplate of the Braun tube and with the lens surface. In other words, if the gel-state silicon resin is separated out of the intimate contact with the faceplate surface or the lens surface, air enters into the gap therebetween, with the result that reflection at the interface occurs. Although the separation of the silicon resin from the lens surface or the faceplate surface is caused chiefly by temperature change, it is desired that in order to prevent the separation, the gel-state silicon resin have great adhesion.

The adhesion of the gel-state silicon resin is 50 g/cm$^2$ or above to the glass surface, and about 20 g/cm$^2$ to the acrylic resin surface. When a lens of acrylic resin is used in FIG. 7, it is effective to use a surface treating agent called the primer in order to increase the adhesion.

That is, the primer is coated on the surface of the concave lens 36 in FIG. 7 with which the gel-state silicon resin is to be made in contact, and dried before the silicon resin is poured. The primer increases the adhesion as a result of reaction with the acrylic resin surface and the silicon resin. The adhesion of 50 g/cm$^2$ or above can be achieved by use of the primer. The constituents of the primer are:

| | |
|---|---|
| (1) $CH_3(CH_2)_nCH_3$ | 90% or above |
| (2) $R_n—Sl—(OR)_{4n}$ | small amount |
| (3) $R_n—Tl—(OR)_{4n}$ | small amount |

Where R represents alkyl group. The $CH_3(CH_2)_nCH_3$ is solvent for coating ability, and the $R_n—Sl—(OR)_{4n}$ and $R_n—Tl—(OR)_{4n}$ are effective for increase of the adhesion.

The primer is effective at the normal temperature or so, but may cause the separation at extremly low temperature because the gel-state silicon resin contracts, and the distance between the faceplate of Braun tube and the lens is constant.

Figure 10A:
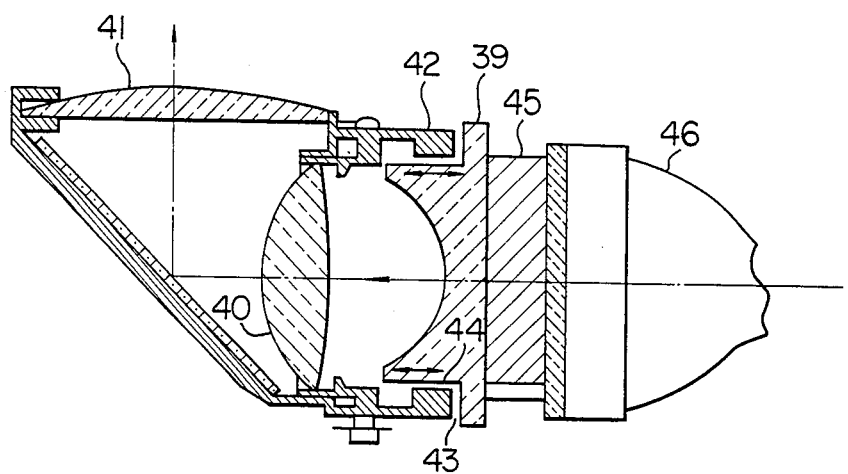
FIG. 10a is a cross-sectional diagram of a lens not fixed to a lens holder.

FIG. 10a shows the means by which the separation at very low temperature can be prevented. The lens system is formed by lenses 39, 40 and 41. The lenses 41 and 40 are fixed to a lens holder 42 (as shaded) for supporting the lenses, and only the lens 39 is not fixed to the lens holder 42 but is free to move along the optical axis.

Figure 10B:
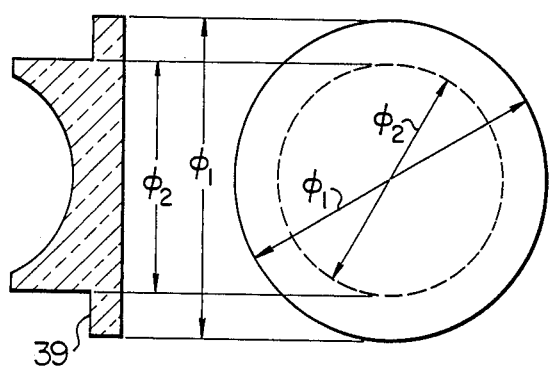
FIG. 10b is a side and front view of the lens to which reference is made in explaining the dimensions of the lens.

The lens 39, as shown in FIG. 10b, has a diameter $\phi_1$ on the side where the gel-state silicon resin 45 is made in contact with the lens and this diameter $\phi_1$ is larger than the inner diameter of the lens holder 42. The opposite-side diameter $\phi_2$ of the lens 39 is smaller than the inner diameter of the lens holder 42. As an example, $\phi_1$ and $\phi_2$ are selected to be 140 mm and 120 mm, respectively. In addition, the gaps, 43 and 44 in FIG. 10a are selected to be about 0.1 to 0.2 mm in order that the lens 39 can be freely moved along the optical axis within the lens holder 42. In this case, the gap 43 is changed as the lens 39 moves.

When the silicon resin is poured, the gap 44 is made sufficiently small. When the silicon resin, 45 is cured into a gel state and then the gel state silicon resin contracts at an extremely low temperature, the lens 39 moves to the Braun tube 46 side (right in the figure), thus never separating from the silicon resin. The amount of the movement will be described below.

The area of a video picture (television picture) to be displayed on the Braun tube is, for example, 100 cm$^2$. The distance between the glass faceplate of Braun tube and the lens is, for example, about 6 mm. Thus, the volume of the gel-state silicon resin is about 60 cm$^3$. On the other hand, the thermal expansion coefficient of the gel-state silicon resin is $10^{-3}/°$ C. Therefore, the amount of movement of the lens relative to the lens holder is $6\times10^{-3}$ mm/° C. If the lens holder is constructed to absorb this amount of movement, the separation can be avoided.

When a two-liquid mixture silicon resin was used as an example, the refractive index $n_x$ was 1.41. In this case, the reflectivities, rgx and rlx were 0.0019 (0.19%), and 0.00076 (0.076%), respectively from Eqs. (7) and (8) where ng and nl were 1.54 and 1.49 respectively. Thus, the reflectivities are extremely small enough and can be taken as zero in practical use. Therefore, the brightness and contrast ratio of the projected picture can be greatly improved.

While a two-liquid mixture type silicon resin is described above, a three or above-liquid mixture type silicon resin can be used.

The effect of this invention is listed on Table 2.

The values on the Conventional column of Table 2 are the same as those of Table 1. From Table 2, it will be understood that the brightness in this invention is improved by about 1.8% and that the contrast ratio is also improved about 2.3 times as great. This is because the reflection in the glass faceplate of Braun tube can be decreased and the brightness of the black portion displayed can be improved greatly (, or the black portion can be made blacker).

TABLE 2

| | Conventional | Invention | Improved |
|---|---|---|---|
| Brightness on Braun tube (cd/m$^2$) A | 4,000 | 4,000 | — |
| Brightness of white portion (cd/m$^2$) B | 3,645 | 3,710 | +1.8% |
| Brightness of black portion (cd/m$^2$) C | 363 | 157 | −56.7% |
| Transmission coefficient (%) B/A | 91.1% | 92.8% | +1.7% |
| Contrast ratio B/C | 10.0 | 23.6 | 2.36 times |

As described above, the picture quality can be improved by this invention.

According to this invention, since a liquid silicon resin is poured in the space, the allowance of the distance between the glass faceplate of Braun tube and the lens can be absorbed enough. In addition, the lens is not fixed to the lens holder, but is made movable, so that no separation occurs between the gel-state silicon resin and the glass faceplate of Braun tube and between the gel-state silicon resin and the lens.

Although the invention has been described in the preferred form with a certain degree of particularity, it is understood that the present disclosure of the preferred form has been changed in the details of construction, and the combination and arrangement of parts may be modified without departing from the spirit and the scope of the invention as hereinafter claimed.

We claim:

1. A video projector for projecting a video picture displayed on Braun tube means through lens means onto screen means such that a plurality of independent light beams emitted from said Braun tube means are composed with each other on said screen means, wherein a space between said Braun tube means and said lens means is filled with a silicon resin having a refractive index approximately the same as that of each of a glass faceplate of said Braun tube means and the material of said lens means, said silicon resin comprising at least two liquids which is in a liquid phase just after said at least two liquids are mixed and which is cured into a gel state, and wherein said lens means is supported by lens holder means so that said lens means is movable along an optical axis within said lens holder means.

2. A video projector according to claim 1, wherein said Braun tube meams includes three independent Braun tubes for emitting three independent light beams respectively, wherein said lens means includes three lenses respectively associated with said three independent Braun tubes, and wherein a space between each of said Braun tubes and the associated one of said lenses is filled with said silicon resin.

3. A video projector according to claim 2, wherein the associated one of said lenses is supported by a lens holder of said lens holder means so that said lens is movable along an optical axis within said lens holder.

* * * * *

UNITED STATES PATENT AND TRADEMARK OFFICE
CERTIFICATE OF CORRECTION

PATENT NO.   : 4,729,031
DATED        : Mar. 1, 1988
INVENTOR(S)  : Saito et al.

It is certified that error appears in the above-identified patent and that said Letters Patent are hereby corrected as shown below:

IN THE TITLE PAGE:

Line [30], delete "Jul. 28, 1983" and insert

--Jul. 27, 1983--

Signed and Sealed this

Twenty-eighth Day of February, 1989

*Attest:*

DONALD J. QUIGG

*Attesting Officer*    *Commissioner of Patents and Trademarks*